July 4, 1961 E. J. WALDEN 2,990,683
IGNITION OF SOLID ROCKET PROPELLANTS
Filed Dec. 30, 1957 2 Sheets-Sheet 1
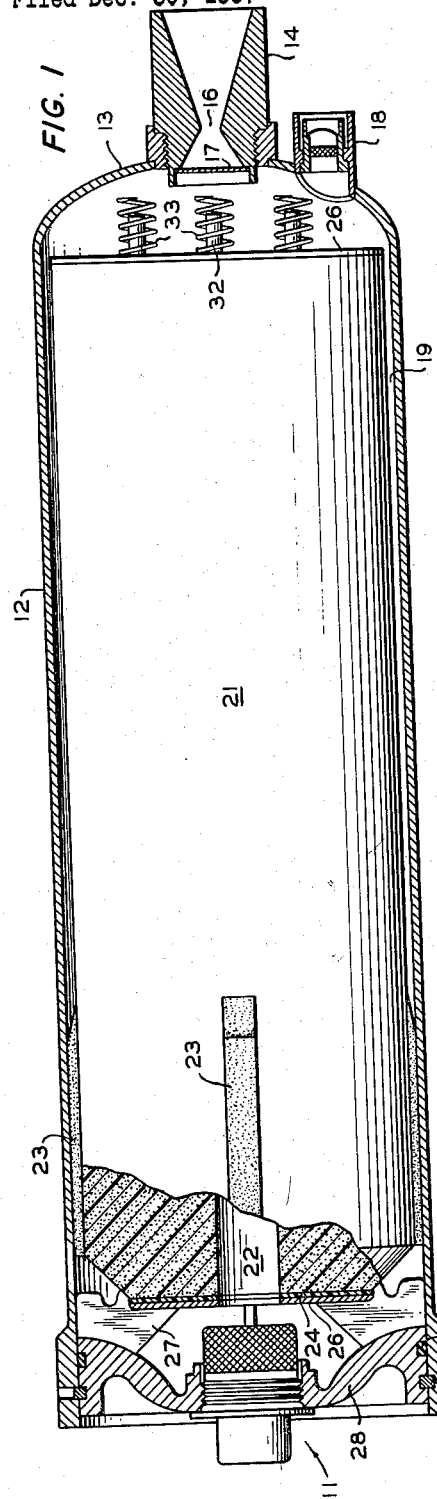
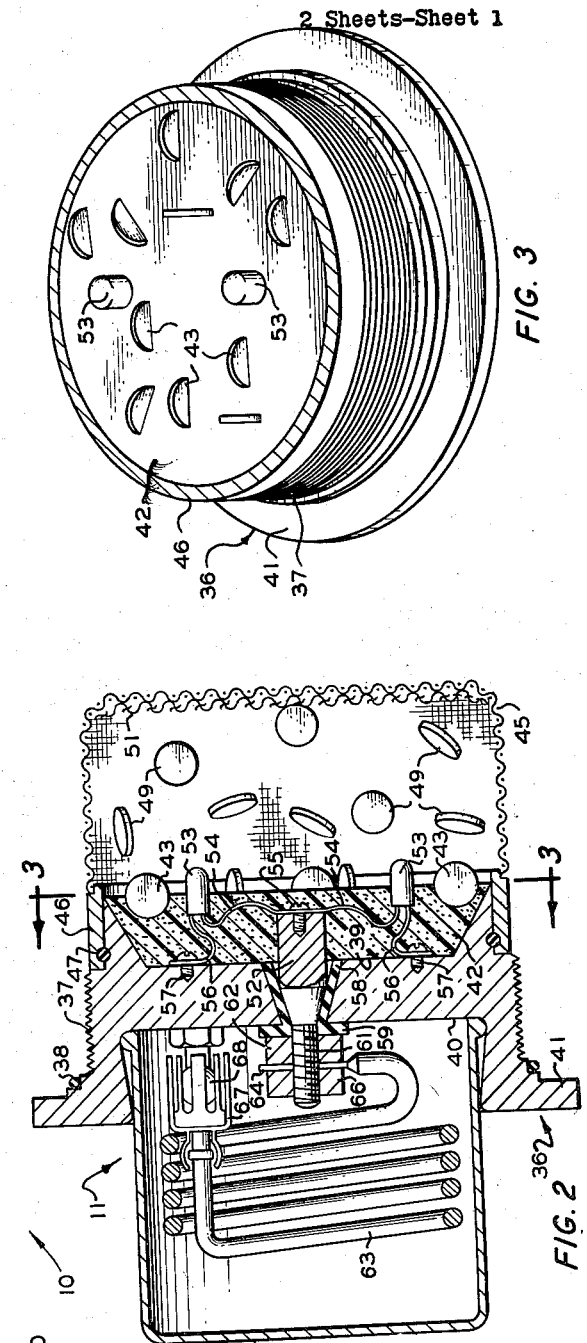
INVENTOR.
E. J. WALDEN
BY Hudson & Young
ATTORNEYS INVENTOR.
E. J. WALDEN
BY Hudson & Young
ATTORNEYS

United States Patent Office 2,990,683
Patented July 4, 1961

2,990,683
IGNITION OF SOLID ROCKET PROPELLANTS
Ernest J. Walden, Waco, Tex., assignor to Phillips Petroleum Company, a corporation of Delaware
Filed Dec. 30, 1957, Ser. No. 706,211
14 Claims. (Cl. 60—35.6)

This invention relates to the ignition of solid rocket propellants. In one aspect it relates to improved means for igniting solid rocket propellants, such as those propellants loaded in rocket motors employed to assist the take-off of aircraft. In another aspect it relates to solid propellant rocket motors having an improved ignition means. In another aspect it relates to novel ignition sustaining material.

Recently, superior solid propellant materials have been discovered which comprises a major proportion of a solid oxidant; such as ammonium nitrate or ammonium perchlorate, and a minor amount of a rubbery binder material, such as a copolymer of a conjugated diene and a vinylpyridine or other substituted heterocyclic nitrogen base compound, which after incorporation is cured by a vulcanization reaction. Solid propellant mixtures of this nature and a process for their production are disclosed and claimed in copending U.S. application Serial No. 284,447, filed April 25, 1952, by W. B. Reynolds and J. E. Pritchard. While it is not intended to so limit the instant invention, it is especially applicable to rocket motors which employ these solid propellant materials.

These aforementioned composite solid rocket propellants are inherently difficult to ignite, especially where ammonium nitrate is utilized as the solid oxidant. Ammonium nitrate-binder composite solid rocket propellants have a relatively high auto-ignition temperature (e.g., 600° F.) and while their specific heats are relatively high, their heat transfer coefficients are low. Moreover, the ignitability of these propellants often varies due to condensation of moisture, variations in propellant surfaces due to extrusion phenomenon, curing, etc. As a result it is often difficult to completely ignite these propellants in a reproducible manner throughout a wide range of temperature conditions. Incomplete or poor ignition of a propellant is evidenced by a relatively long period of ignition lag or delay, often resulting in a misfire or hang-fire. Service requirements for rocket motors loaded with these types of propellants are severe, and military acceptance of a particular rocket motor design loaded with these propellants often requires proven, satisfactory and reproducible ignition, for example, in the temperature range of about —75° F. to +170° F., or more generally in the range of from —60° F. to +160° F. Generally, these solid composite propellants are more difficult to ignite and burn at the lower end of the temperature range, i.e., —60° F. to —75° F., than at the higher temperatures.

An improved igniter which overcomes to a great extent the aforementioned ignition difficulties is that disclosed and claimed in copending U.S. application Serial No. 591,340, filed June 14, 1956, by Barnet R. Adelman. However, with production processing variables involved in the manufacture of solid propellant rocket motors provided with the ignition means disclosed in the last mentioned application, a need arose to provide additional measure to insure complete and reproducible ignition. The instant invention provides such measures in a novel ignition means which can be regarded in some aspects as an improvement over that ignition means disclosed in said last-mentioned application.

Accordingly, an object of this invention is to provide improved means for igniting solid rocket propellants, such as those propellants loaded in rocket motors employed to assist the take-off of aircraft. Another object is to provide solid propellant rocket motors having improved ignition means. Another object is to improve the ignition of solid propellants throughout a wide range of temperature conditions, especially at relatively low temperatures, e.g., —65° F. to —75° F. Another object is to minimize the ignition lag and virtually eliminate misfires and hang-fires upon the firing of solid propellant rocket motors. Further objects and advantages of this invention will become apparent to those skilled in the art from the following discussion, appended claims and drawing in which:

FIGURE 1 is a side elevational view in partial section of a solid propellant rocket motor equipped with the novel ignition means of this invention;

FIGURE 2 is an enlarged side elevational view in partial section of the ignition means illustrated in FIGURE 1;

FIGURE 3 is an enlarged isometric view of a portion of FIGURE 2 taken along the plane indicated.

Figure 4:
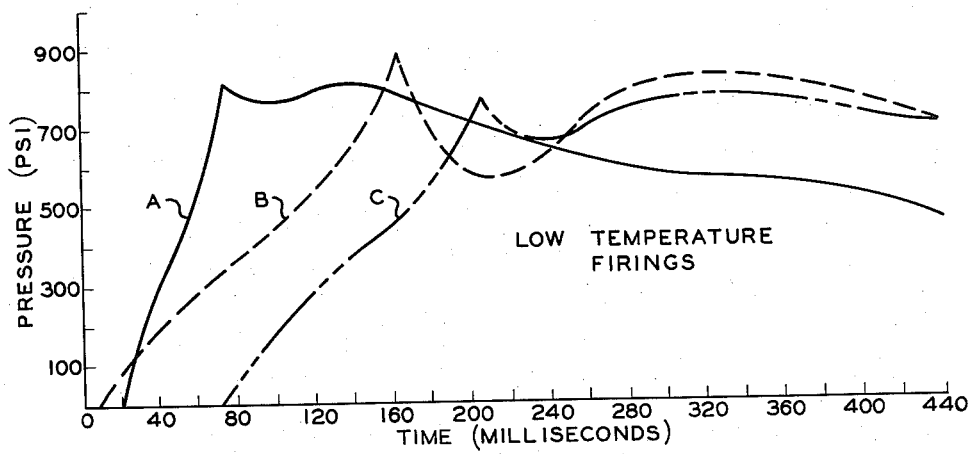
FIGURES 4 and 5 are graphs illustrating the improvements and advantages of this invention.

Referring now to the drawing, and in particular to FIGURE 1, there is illustrated a rocket motor 10 which includes igniter assembly 11 of the instant invention. The rocket motor comprises a cylindrical metal casing 12 which has a reduced aft portion 13 having an opening into which a reaction nozzle 14 is threaded. The nozzle is formed with internal restrictions so as to define a converging-diverging passage 16 through which the combustion gases pass. A blow-out diaphragm or starter disk 17, which covers the inner opening into passage 16, is designed so as to be ejected through the nozzle passage when the chamber pressure reaches a predetermined value, e.g., between 200 and 500 p.s.i. The reduced casing portion of the rocket motor is also provided with a safety plug attachment 18 which is adapted to rupture at a predetermined chamber pressure. By providing for this attachment, the buildup of excessive pressures in the combustion chamber which might rupture the cylindrical casing of the rocket motor is prevented. Any suitable device for releasing excessive pressure can be utilized as is well known to those skilled in the art.

The cylindrical casing defines a combustion chamber 19 in which the solid propellant charge 21 is disposed. The specific propellant charge illustrated is cylindrical in shape and has an outer diameter smaller than the inner diameter of the casing. The propellant is an internal-external burning type by reason of its exposed or unrestricted outer surfaces and its inner exposed surface which is defined by an axial perforation 22 extending the length of the propellant. A plurality of resilient retaining pads 23, e.g., strips of sponge rubber, are positioned between the head portion of the external burning surface and the adjacent head portion of the casing. The ends of the propellant are restricted by means of a layer of restricting material 24 which has a central opening in alignment with perforation 22. Retaining plates 26 having similar openings cover the outside of the restricting material. Secured to the head retaining plate are outer-extending prongs or legs 27 which are adapted to register with and are held in place by head closure assembly 28 having retention means for igniter assembly 11. Head closure assembly 28 is held in position in the head end of casing 12 by means of key 29 which fits into appropriate grooves formed in the casing and head closure assembly 28. A sealing ring 30 is positioned in a groove cut into assembly 28 to prevent escape of combustion gases from the head end of the casing. The head end of the cylindrical casing is closed by means of head closure assembly 28 in combination with the igniter assembly which is retained in the opening provided in the axial portion of assembly 28. It is noted that the removable cover of the igniter assembly extends through this axial opening.

The aft retaining plate has secured to its outer surface a plurality of prongs 32. The prongs are each surrounded by a compression spring 33 adapted to come into contact with the reduced portion 13 of the casing. The aft retaining plate is thereby maintained firmly against the restricting material which covers the after end of the solid propellant.

It is to be understood that the utility of the improved ignition means of this invention is not limited to the particular propellant charge 21 illustrated in FIGURE 1. It is within the scope of this invention to ignite any type of charge, such as the external-burning type, the internal burning type, the end-burning type, etc. Moreover, a rocket motor can be loaded with a plurality of propellant grains and a plurality of igniter assemblies like 11 of FIGURE 1 can be attached to the rocket motor.

Referring now to FIGURES 2 and 3 of the drawing, there is illustrated in detail the various elements of igniter assembly 11. The igniter assembly comprises an igniter plug 36 which is provided with external threads 37. As shown in FIGURE 1, these threads provide means for securing the plug in head closure assembly 28 attached to the head end of the rocket motor casing. An O-ring 38, which comes into contact with assembly 28 when the igniter assembly is placed in the rocket motor, furnishes a gas-tight seal for the head end of the motor. The inner and outer faces 39 and 40, respectively, of the igniter plug are countersunk so as to form recessed portions or cavities in the ends of the plug. The outer end of the plug is provided with shoulders 41 which are in contact with head closure assembly 28 when the igniter assembly is in position as shown in FIGURE 1.

Disposed within the inner recessed portions or cavity of the igniter plug 36 is a disk of ignition sustaining material 42 in which are embedded in an edgewise and random manner a plurality of pellets 43, portions of the latter preferentially partially protruding from the inner face of sustaining material 42. A frangible container 45, such as a wire basket or plastic (e.g., nylon) cup, has a lip which attached to the inner end of the igniter plug. As illustrated, this attachment is accomplished by welding or brazing container 45 to a ring member 46 which in turn is held in place on the igniter plug by means of wire 47. Where the container 45 is a wire basket, the perforations in container are closed by dipping the container into a rubber solution or by coating with plastic material such as cellulose acetate plastic molding compound or other suitable covering material which will rapidly soften or rupture upon being subjected to heat. For a more complete description of the wire basket and covering materials which can be employed, reference can be had to copending U.S. application Serial No. 605,904, filed August 23, 1956, by O. D. Ratliff. An igniter material 49, which serves as the principal source of hot ignition products, is disposed within the container in contact with the ignition sustaining material 42. The igniter material 49 is preferably in granular or pelleted form and is held firmly in place within the container 45 and against the ignition sustaining material 42 by means of a thin layer of material 51, such as cotton, placed in the end of the container.

An electrical conductor or contact member 52 extends through a central opening of plug 36 and ignition sustaining materials 42. One end of the contact member 52 terminates exteriorily of the outer face of the plug while the other end extends into the igniter material 42 disposed within container 45. A pair of electrical ignition means 53, which can be squibs, electrical matches, or other suitable ignition means, are disposed within the container 45 in contact with the igniter material 49 therein. Electrical leads 54 which are connected to the squibs are further attached to contact member 52 by means of a bolt 55 threaded into the end of that member. The squibs are grounded to the plug by means of electrical leads 56 which are connected to the igniter plug by means of bolts 57. Contact member 52 is prevented from contacting plug 36 by means of insulating member 58. The outer end of contact member 52 is provided with threads 61 upon which there is threaded a nut 62 for holding in place the contact member as well as insulating member 58. Insulating washer 59 is disposed between outer face 40 of the plug and nut 62 to prevent contact between these two elements. Electrical lead 63 has one of its ends connected to contact member 52 by means of a circular contact 64 which fits over the end of the contact member. Contact 64 is held in place by means of a nut 66 threaded onto the end of contact member 52. The other end of electrical lead 63 has a plug 67 connected thereto to furnish means for connecting the igniter assembly to a source of electrical current. Attached to the outer face of the plug is a ballstud 68 to which plug 67 is attached when disconnected from the source of electrical current. A cover 69 fits into the outer recessed portion of the ignited plug, thereby covering the outer end of contact member 52 and electrical lead 63 connected thereto. When it is desired to place the rocket motor in readiness for firing, cover 69 is removed after which plug 67 is detached from ballstud 68 and plugged into an electrical circuit which includes a source of current, such as a storage battery.

In the operation of the rocket motor shown in the drawing, the motor is armed by removing cover 69 from the igniter assembly and connecting plug 67 of electrical lead 63 into an electrical circuit, not shown, which includes a source of power. Upon closing of a suitable switch, electrical current flows to squibs 53 through electrical lead 63, contact member 52 and electrical leads 54. On being supplied electrical current, the squibs function in a manner well known in the art to ignite igniter material 49 with which they are in contact.

The igniter material 49 in burning forms hot combustion products which break the frangible container 45, for example the products soften or rupture the plastic or rubbery material covering the perforations of container 45. These primary ignition combustion products then enter the combustion chamber 19 of the rocket motor. The heat from this principal source of igniter combustion products is transferred to the exposed internal and external burning surfaces of the propellant grain, raising the same to an ignition temperature. The propellant material then burns and generates combustion gases which raise the pressure in the rocket motor combustion chamber 19 to a desired working pressure. During this time, the ignition of the primary igniter material 49 results in the ignition of the sustainer material 42, 43 in contact therewith. The sustainer material 42 has a relatively slow burning rate and is designed to be burned through by the time the starter disk in the rocket motor ruptures or at start of the customary pressure saddle, the most critical ignition period. When the combustion chamber pressure reaches a starter disk bursting pressure, the starter disk 17 functions, for example by rupturing, thereby permitting the combustion gases in the combustion chamber to escape via the nozzle passage.

Although the pressure builds up rapidly to an operating pressure after the functioning of the starter disk, incomplete ignition of all propellant surfaces will cause a drop in pressure as evidenced by a pronounced saddle on the pressure or thrust vs. time curve. If this drop in pressure is severe a hangfire will occur and it will be some time before the all propellant surface is fully ignited and full performance established. An extreme and sudden drop in pressure due to incomplete ignition of all propellant surfaces will often cause the propellant burning to stop or "snuff out," resulting in a misfire. These phenomena most often occur at relatively low temperatures, e.g., −65° F. to −75° F. However, with the provision of sustainer material 42 and embedded pellets 43 these phenomena are virtually eliminated because these materials are ignited by the burning ignition material 49 and are designed to produce supplemental ignition products immediately before and after the starter disk functions during the critical ignition phase. The full effect of the energy from the burning pellets 43 is not released until the sustainer material 42 has partially burned, thereby exposing the burning surface of the embedded pellets. As the ignition of the propellant grain approaches completion the energy from the sustainer material 42 and embedded pellets 43 decreases, resulting in a smooth overall ignition without an ignition shock or brisance, the latter normally evidenced by pressure peaks, especially at relatively high temperatures, e.g., 160–170° F.

As a typical example at −75° F., the pellets 49 will burn about the first 75 to 100 milliseconds after firing and the sustainer 42 will burn an additional 100 to 150 milliseconds. The starter disc will burst at about 750 to 850 p.s.i at −75° F. The nominal operating pressure of the rocket motor at −75° F. will be about 600 p.s.i. and the corresponding nominal thrust will be about 700 lbs. The nominal operating pressure at 60° F. will be about 900 p.s.i. and the corresponding nominal thrust will be about 1000 lbs.

The sustainer material 42 is that disclosed and claimed in copending U.S. application, Serial No. 591,340, by B. R. Adelman. This sustaining material comprises a mixture of (1) between about 60 and 75 weight percent of a solid oxidant such as the ammonium, alkali metal and alkaline earth metal salts of nitric, perchloric and chloric acids; (2) between about 10 and 40 weight percent of a rubbery polymer as a binder; and (3) between about 5 and 25 weight percent of a finely divided or powdered metal, such as aluminum, magnesium or titanium.

Suitable oxidants which can be utilized in these sustainers representatively include ammonium nitrate, ammonium perchlorate, sodium nitrate, barium nitrate, lithium perchlorate, potassium chlorate, sodium perchlorate, and the like, including mixtures thereof. These oxidants are utilized in finely divided form, e.g., 100 to 250 mesh.

The rubbery polymer serves as a fuel as well as a binder for the other ingredients. Especially useful rubbery polymers which can be used as the binder are polysulfide liquid polymers, such as those prepared by the Thiokol Chemical Company, Trenton, New Jersey, and designated LP-2, LP-3, LP-8, LP-32, and LP-33, depending upon the degree of crosslinking and degree of polymerization. Other applicable rubbery polymers which can be used as binders in this invention include those disclosed in the copending application Serial No. 284,447, filed April 25, 1952, by W. B. Reynolds et al., such as a copolymer of a conjugated diene (e.g., 1,3-butadiene) and a heterocyclic nitrogen base compound having a $CH_2=C<$ group (e.g., 2-methyl-5-vinylpyridine). Other useful rubbery polymers include GR-S rubber, neoprene, and the like. Polyurethanes are also applicable as binders, a typical composition comprising 30–40 parts by weight castor oil, 30–40 parts by weight Flexricin 15 (ethylene glycol monoricinoleate), and 20–35 parts by weight Nacconate 65 (toluene diisocyanate).

Polysulfide polymers are preferably used as binders in this invention because they can be readily molded and cured at low temperatures (e.g., room temperature).

Various other compounding ingredients can be incorporated into the sustainer materials to stabilize combustion and increase the burning rate, e.g., $Fe_2O_3$, copper chromite, ammonium dichromate, Milori blue, and other compounds normally used as burning rate modifiers or catalysts in solid rocket propellant formulations. Suitable smoke depressants, e.g., MgO, can also be incorporated. Plasticizers can also be incorporated into the sustainer mixture, e.g., Philrich 5 (a highly aromatic oil), Sundex 53 (aromatic product derived from petroleum), Chlorowax 40 (liquid chlorinated paraffins), Califlux TT (naphthenic hydrocarbon, predominately unsaturated), TP–90 B (dibutoxyethoxyethyl formal), ZP–211 (same as TP–90 B except that it is topped to remove low boiling materials), and the like. Various curing agents can be added, e.g., sulfur, GMF (p-quinone dioxine) etc., as well as curing accelerators, e.g., DPG (diphenyl guanidine), Philcure 113 (N,N-dimethyl-S-tertiary butylsulfenyl dithiocarbamate), Butyl 8 (a dithiocarbamate-type rubber cure accelerator), and the like. Various fillers can also be incorporated such as various carbon blacks sold under trade names like thermax, P-33, Philblack A, Kosmos 20, Pelletex, and Sterling LL.

In general, suitable binder formulations which can be used have recipes falling within the ranges given in Table I.

*Table I*

| Binder ingredient: | Parts per 100 parts rubber |
|---|---|
| Rubber (LP-3) | 100 |
| Curing agent (GMF) | 6–8 |
| Curing agent (S) | 0.25–2.50 |
| Curing accelerator (DPG) | 2.5–3.5 |
| Smoke depressant (MgO) | 0.5–2.0 |
| Plasticizer (ZP–211) | 0–15 |
| Filler (Thermax) | 5–25 |
| Burning rate catalyst ($Fe_2O_3$) | 0–7.8 |

Examples of specific formulations of sustaining material are set forth below in the table:

*Table II*

| | Parts by Weight | | | | | |
|---|---|---|---|---|---|---|
| | A | B | C | D | E | F |
| LP-3 [1] | 21.6 | 31.2 | 24.8 | 16.4 | 20.8 | 36.5 |
| Diphenyl guanidine | 0.6 | 0.9 | 0.7 | 0.5 | 0.6 | 1.1 |
| p-Quinone dioxine | 1.5 | 2.2 | 1.7 | 1.1 | 1.3 | 2.6 |
| Di-(butoxyethyoxyethoxy)-methane | 1.1 | 1.6 | 1.2 | 0.8 | 1.0 | 1.8 |
| Sulfur | 0.1 | 0.2 | 0.1 | 0.1 | 0.1 | 0.4 |
| Carbon black | 2.2 | 3.1 | 2.5 | 1.6 | 0.5 | 3.6 |
| MgO | 0.2 | 0.3 | 0.2 | 0.2 | 0.2 | 0.4 |
| $Fe_2O_3$ | 0.3 | 0.5 | 0.4 | 0.2 | 0.5 | |
| Aluminum | 7.1 | 5.9 | 16.4 | 10.7 | 6.0 | 3.6 |
| $NH_4ClO_4$ | | 19.7 | 52.0 | | | |
| $KClO_4$ | 65.3 | 34.4 | | 68.4 | 69.0 | 50.0 |

[1] A polysulfide liquid polymer (Thiokol rubber) produced by Thiokol Chemical Corporation, Trenton, New Jersey.

The various ingredients in the sustainer compositions may be mixed on a roll mill or an internal mixer such as a Banbury or a Baker-Perkins dispersion blade mixer may be employed. The sustainers can be formed in any desired shape by compression molding, injection molding, or extrusion. The curing can be accomplished at room temperature, but the overall cure time can be reduced by heating at a temperature in the range of 100° to 180° F. It is also within the scope of the invention to pour the mixed ingredients of the sustainer compositions into the inner cavity of the igniter assembly and effect the cure in place at ordinary temperatures. The pellets 43 can be embedded in the sustainer material prior to the curing of the latter.

The pellets 43 and 48 are prepared according to copending application, Serial No. 592,995, filed June 21, 1956, by L. G. Herring. As disclosed in the Herring application, the igniter composition is formed of a plurality of discrete pellets comprising powdered metal, powdered inorganic oxidizing material, and a binding agent, ethylcellulose. Table III sets forth a general recipe for this type of principal igniter material and Table IV sets forth specific compositions.

Table III

| Igniter ingredients | Parts by Weight | Weight Percent |
|---|---|---|
| Pyrotechnic components | | 98–85 |
| Potassium perchlorate | 0–68 | |
| Barium nitrate | 0–70 | |
| Zirconium dichromate | 0–58 | |
| Zirconium/nickel alloy | 0–80 | |
| Aluminum | 0–33 | |
| Magnesium | 0–47 | |
| Titanium | 0–65 | |
| Zirconium hydride | 0–2 | |
| Boron | 0–9 | |
| Supplemental pressure components | | 0–5 |
| Black powder | 0–3 | |
| Tetranitrocarbazole | 0–5 | |
| Binding agent: ethylcellulose | | 2–15 |

Table IV

| Ingredient | Weight Percent | | | | |
|---|---|---|---|---|---|
| | A | B | C | D | E |
| Potassium perchlorate | 50 | 26.5 | 63.1 | 62.5 | 62.5 |
| Barium nitrate | 15 | 16.6 | | | |
| Zirconium-nickel alloy (50/50) | 32 | 53.9 | 12.6 | 12.5 | 12.5 |
| Aluminum | | | 12.6 | 12.5 | 12.5 |
| Boron | | | 8.7 | 8.7 | 8.7 |
| Ethylcellulose | 3 | 3 | 3 | 3.8 | 3 |
| Calcium stearate | | | | | 0.8 |

The solid propellants which can be ignited with the novel ignition means of this invention include any of those known being fabricated, e.g., dual or composite base, mono-base, etc. The composite base propellants disclosed and claimed in said copending application Serial No. 284,447 by W. B. Reynolds et al. have proven to be readily ignited according to this invention and therefore are preferred. These preferred composite propellants are of the rubbery copolymer-oxidant type which is plasticized and worked to prepare an extrudable mass at 130° to 175° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded grains of propellant at temperatures preferably in the range of 170° to 185° F. In addition to the copolymer binder and other ingredients, the propellant composition comprises an oxidant and a burning rate catalyst.

The copolymers are preferably formed by copolymerization of a vinyl heterocyclic nitrogen compound with an open chain conjugated diene. The conjugated dienes preferably employed are those containing 4 to 6 carbon atoms per molecule and representatively include 1,3-butadiene, isoprene, 2,3-dimethyl-1,3-butadiene, and the like. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaced the vinyl group are also applicable.

In the preparation of the copolymers, the amount of conjugated diene employed can be in the range between 75 and 95 parts by weight per 100 parts monomers and the vinyl heterocyclic nitrogen can be in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/ MVP. This copolymer is polymerized to a Mooney (ML–4) plasticity value in the range of 10–40, preferably in the range of 15 to 25, and may be masterbatched with 5–20 parts of Philblack A, a furnace black, per 100 parts of rubber.

The following empirical formulation or recipe generally represents the class of propellant compositions preferred for the preparation of the grains of propellant of this invention:

Table V

| Ingredient | Parts per 100 Parts of Rubber | Parts by Weight |
|---|---|---|
| Binder | | 10–25 |
| Copolymer (Bd/MVP) | 100 | |
| Philblack A (a furnace black) | 10–30 | |
| Plasticizer | 10–30 | |
| Silica | 0–20 | |
| Metal oxide | 0–5 | |
| Antioxidant | 0–5 | |
| Wetting agent | 0–2 | |
| Accelerator | 0–2 | |
| Sulfur | 0–2 | |
| Oxidant (Ammonium nitrate) | | 75–90 |
| Burning rate catalyst | | 0–30 |

Suitable plasticizers useful in preparing these grains of propellant include TP–90–B; benzophenone; and Pentaryl A (monoamylbiphenyl). Suitable silica preparations include a 10–20 micron size range supplied by Davison Chem. Co.; and Hi-Sil 202, a rubber grade material supplied by Columbia-Southern Chem. Corp. A suitable anti-oxidant is Flexamine, a physical mixture containing 25 percent of a complex diarylamine-ketone reaction product and 35 percent of N,N'-diphenyl-p-phenylenediamine. A suitable wetting agent is Aerosol-OT (dioctyl sodium sulfosuccinate). Satisfactory rubber cure accelerators include Philcure 113; Butyl-8; and GMF. Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, and the like, can also be used.

The layer of restricting material can be made from any of the slow burning materials used for this purpose in the art, such as cellulose acetate, ethylcellulose, butadiene-methylvinylpyridine copolymer, GR–S, natural rubber, and the like.

The pellets 43 and 49 will have a diameter generally in the range of about 3/16 to 3/8, preferably about 1/4 inch, and will have a thickness generally in the range of about 0.08 to 0.15 inch preferably about 0.10. The number of pellets 43 embedded in the sustainer 42 will generally be in the range of about 10 to 25, preferably about 16, and the total weight of these pellets will generally be in the range of about 2 to 6 grams, preferably about 4 grams. The number of pellets 49 in container 45 will generally be in the range of about 480 to 620, preferably about 530, and the total weight of these pellets will generally be in the range of about 90 to 115 grams, preferably about 100 grams. The estimated burning rates of pellets 43, 49 will generally be in the range of about 0.7 to 1.2 in./sec. at 500 p.s.i. and 60° F. and will have a density generally in the range of about 0.083 to 0.093 lbs./in.$^3$.

The sustainer material 42 will generally weigh about 50±10 grams and will have a burning rate generally about 0.55 to 0.85 in./sec. at 500 p.s.i. and 60° F. The pellets 43 are embedded therein at random preferably oriented in an edgewise manner or normal to the inner face of sustainer 42, with portions preferably protruding therefrom.

Figure 5:
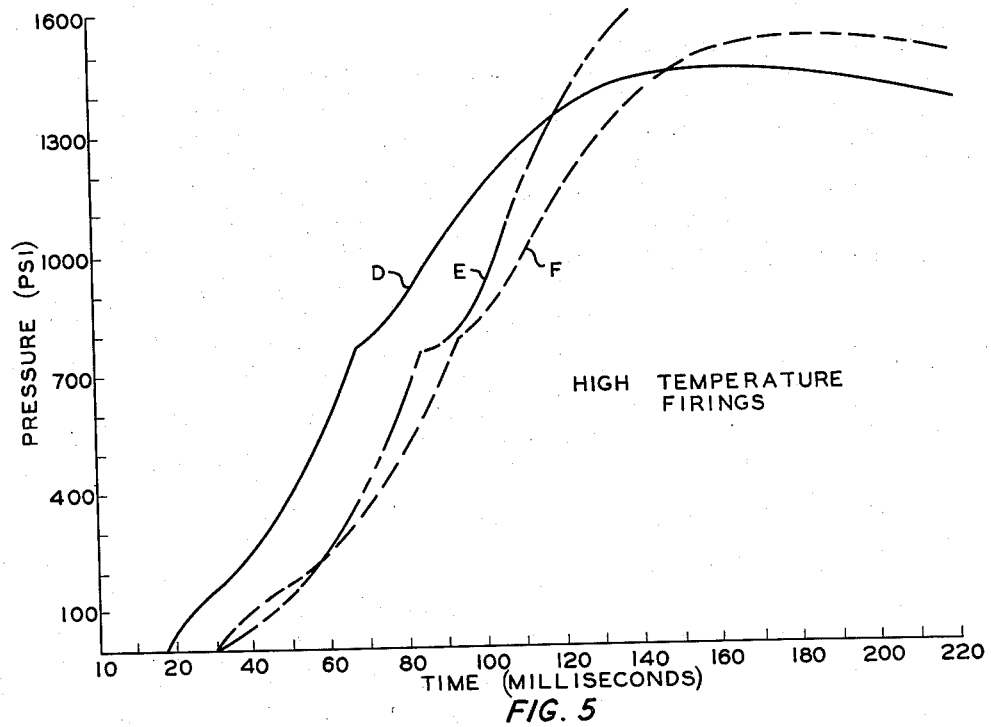

A fuller understanding of this invention can be had by referring to the graphs in FIGURES 4 and 5 of the drawing, wherein typical pressure vs. time curves A and D are shown representing graphically the results obtained by actually firing rocket motors like that of FIGURE 1 equipped with the novel igniter of this invention. For comparison purposes these graphs also have curves B, C, E, and F representing typical pressure vs. time curves obtained by firing similar rocket motors equipped with the ignition means of said copending application, Serial No. 591,340, where the sustainer material did not have any embedded pellets. In all of the firings represented by the curves of FIGURES 4 and 5, the rocket propellants had the following recipe:

Table VI

| Ingredient: | Weight percent |
| --- | --- |
| Butadiene/methylvinyl pyridine copolymer (90/10) | 11.06 |
| Philblack A | 2.49 |
| ZP-211 | 2.22 |
| Flexamine | 0.33 |
| Magnesium oxide | 0.49 |
| Ammonium nitrate | 81.46 |
| Milori blue | 1.95 |

The pellets used in these firings had the composition B of Table IV. The sustainer composition used in the igniters of this invention is that listed under E in Table II and that used in the igniters of said copending application, Serial No. 591,340 is that listed under A in Table II. The firing data of both types of igniters are set forth in Table VII.

Table VII

| Igniter | No. of Firings | Firing Temp., °F. | Total Ignition Delay (ms.)[a] | Ignition Thrust (lb.)[b] |
| --- | --- | --- | --- | --- |
| Application S.N. 591,340 | 39 | −65 | | |
| Average | | | 161 | 751 |
| Standard deviation | | | 31 | 208 |
| Instant application | 19 | −65 | | |
| Average | | | 81 | 968 |
| Standard deviation | | | 10 | 292 |
| Application S.N. 591,340 | 38 | 160 | | |
| Average | | | 91 | 1,573 |
| Standard deviation | | | 41 | 568 |
| Instant application | 5 | 160 | | |
| Average | | | 66 | 1,883 |
| Standard deviation | | | 6 | 320 |

[a] Application of current to starter disc rupture.
[b] Starter disc rupture.

The above data indicate that the igniter of the instant application reduces ignition delays at −65° F. up to one-half that of the igniter of application S.N. 591,340, and indicate that at 160° F. ignition delays are reduced about one-third that of the igniter of application S.N. 591,340. Although the average ignition thrust at 160° F. is increased slightly with the instant igniter, this increase is not serious since the thrust peaks are well below the allowable maximum of 2500 lbs. Moreover, the reproducibility of ignition of the instant igniter is greater than that of the igniter of application S.N. 591,340.

The curves of Figures 4 and 5 graphically illustrate the improvement and advantages of the instant igniter over that of application S.N. 591,340. In both figures the solid line curves represent firings of the instant igniter and the broken line curves represent firings of the igniters of application S.N. 591,340. In all these curves, the peak represents the point at which the starter disc ruptured. These graphs demonstratably show the shorter ignition delays of the igniters of the instant application which greatly minimizes the possibility of a misfire or a hangfire. Further description of these curves is given in Table VIII.

Table VIII

| Curve: | Firing temperature (° F.) |
| --- | --- |
| A (instant application) | −65 |
| B[1] (application S.N. 591,340) | −75 |
| C[2] (application S.N. 591,340) | −75 |
| D (instant application) | 160 |
| E[1] (application S.N. 591,340) | 170 |
| F[2] (application S.N. 591,340) | 170 |

[1] Sequential round—i.e., where rocket motor was subjected to various environmental tests and then fired.
[2] Statistical round—i.e., where rocket motor was conditioned to firing temperature and fired.

Various modifications and alterations of this invention will become apparent to those skilled in the art without departing from the scope and spirit of this invention and it is to be undertood that the foregoing discussion and attached drawing are merely illustrative and do not limit this invention.

I claim:
1. An ignition sustaining composition comprising: sustaining material comprising 60 to 75 weight percent of an inorganic oxidizing salt selected from the group consisting of the ammonium, alkali metal, and alkaline earth metal salts of nitric, perchloric, and chloric acids, 10 to 40 weight percent of a binder comprising a rubber selected from the group consisting of polysulfide polymers, polyurethanes, and copolymers of conjugated dienes and vinyl substituted heterocyclic nitrogen bases, and 5 to 25 weight percent of finely divided metal selected from the group consisting of aluminum, magnesium, and titanium; and a plurality of pellets of pyrotechnic material embedded at random in said sustaining material and comprising 2 to 15 weight percent ethylcellulose, and 98 to 85 weight percent of a pyrotechnic component having the following composition in parts by weight:

| | |
| --- | --- |
| Potassium perchlorate | 0–68 |
| Barium nitrate | 0–70 |
| Zirconium dichromate | 0–58 |
| Zirconium/nickel alloy | 0–80 |
| Aluminum | 0–33 |
| Magnesium | 0–47 |
| Titanium | 0–65 |
| Zirconium hydride | 0–2 |
| Boron | 0–9 |
| Black powder | 0–3 |
| Tetranitrocarbazole | 0–5 |

2. An ignition sustaining composition according to claim 1 wherein said inorganic oxidizing salt is potassium perchlorate, said rubber is a polysulfide polymer, and said finely divided metal is aluminum.

3. An ignition sustaining composition according to claim 1 wherein said inorganic oxidizing salt is potassium perchlorate, said rubber is a polysulfide polymer, and said finely divided metal is potassium.

4. An ignition sustaining composition according to claim 1 wherein said inorganic oxidizing salt is a mixture of potassium perchlorate and ammonium perchlorate, said rubber is a polysulfide polymer, and said finely divided metal is aluminum.

5. An ignition sustaining composition according to claim 1 where said pellets of pyrotechnic material are only partially embedded in said sustainer material in an edgewise manner.

6. An ignition sustaining composition comprising, in combination, a sustainer material and a plurality of pellets of pyrotechnic material partially embedded at random in said sustainer material, said sustainer material comprising the following composition in weight percent:

| | |
| --- | --- |
| Potassium perchlorate | 60–75 |
| Polysulfide polymer | 10–40 |
| Aluminum | 5–25 | said pyrotechnic material comprising 2 to 15 weight percent ethylcellulose and 98 to 85 weight percent of pyrotechnic components having the following composition in parts by weight:

| | |
|---|---|
| Potassium perchlorate | 0–68 |
| Barium nitrate | 0–70 |
| Zirconium/nickel alloy (25/75 to 75/25) | 0–80 |
| Aluminum | 0–33 |
| Boron | 0–9 |

7. An ignition sustaining composition comprising, in combination, a sustainer material and a plurality of pellets of pyrotechnic material partially embedded at random in said sustainer material, said sustainer material consisting essentially of the following composition in parts by weight:

| | |
|---|---|
| Polysulfide liquid polymer | 15–40 |
| Diphenyl guanidine | 0.5–1.5 |
| p-quinone dioxime | 1.0–3.0 |
| di-(butoxyethoxyethoxy)methane | 0.5–2.0 |
| Sulfur | 0.1–0.5 |
| Carbon black | 0.5–4.0 |
| Magnesium oxide | 0.1–0.5 |
| Ferric oxide | 0–1.0 |
| Aluminum | 3–20 |
| Ammonium perchlorate | 0–55 |
| Potassium perchlorate | 20–75 | said pyrotechnic material comprising 2 to 15 weight percent ethylcellulose and 98 to 85 weight percent of pyrotechnic components having the following composition in parts by weight:

| | |
|---|---|
| Potassium perchlorate | 0–68 |
| Barium nitrate | 0–70 |
| Zirconium/nickel alloy (50/50) | 0–80 |
| Aluminum | 0–33 |
| Boron | 0–9 |

8. In an igniter assembly for a rocket motor loaded with solid propellant, said igniter assembly comprising, in combination, an igniter plug having a recessed inner face forming a cavity, a frangible cup the lip of which is secured to the periphery of said inner face of said plug, a plurality of pellets of pyrotechnic material in said cup and serving as a principal source of ignition combustion products, and electrical ignition initiator means passing through said plug and extending from said inner face thereof into said cup, a disc of ignition sustaining composition disposed within said cavity and serving as a secondary source of ignition combustion products, said sustaining composition comprising, a combination, a sustainer material and a plurality of pellets of pyrotechnic material partially embedded at random in said sustainer material, said sustainer material comprising the following composition in weight percent:

| | |
|---|---|
| Potassium perchlorate | 60–75 |
| Polysulfide polymer | 10–40 |
| Aluminum | 5–25 | said polytechnic material comprising 2 to 15 weight percent ethylcellulose and 98 to 85 weight percent of pyrotechnic components having the following composition in parts by weight:

| | |
|---|---|
| Potassium perchlorate | 0–68 |
| Barium nitrate | 0–70 |
| Zirconium/nickel alloy (25/75 to 75/25) | 0–80 |
| Aluminum | 0–33 |
| Boron | 0–9 |

9. In an igniter assembly for a rocket motor loaded with solid propellant, said igniter assembly comprising, in combination an igniter plug having a recessed inner face forming a cavity, a frangible cup the lip of which is secured to the periphery of said inner face of said plug, a plurality of pellets of pyrotechnic material in said cup and serving as a principal source of ignition combustion products, and electrical ignition initiator means passing through said plug and extending from said inner face thereof into said cup, a disc of ignition sustaining composition disposed within said cavity and serving as a secondary source of ignition combustion products, said sustaining composition comprising, in combination, a sustainer material and a plurality of pellets of pyrotechnic material partially embedded at random in said sustainer material, said sustainer material consisting essentially of the following composition in parts by weight:

| | |
|---|---|
| Polysulfide liquid polymer | 15–40 |
| Diphenyl guanidine | 0.5–1.5 |
| p-Quinone dioxime | 1.0–3.0 |
| di-(Butoxyethoxyethoxy)methane | 0.5–2.0 |
| Sulfur | 0.1–0.5 |
| Carbon black | 0.5–4.0 |
| Magnesium oxide | 0.1–0.5 |
| Ferric oxide | 0–1.0 |
| Aluminum | 3–20 |
| Ammonium perchlorate | 0–55 |
| Potassium perchlorate | 20–75 | said pyrotechnic material comprising 2 to 15 weight percent ethylcellulose and 98 to 85 weight percent of pyrotechnic components having the following composition in parts by weight:

| | |
|---|---|
| Potassium perchlorate | 0–68 |
| Barium nitrate | 0–70 |
| Zirconium/nickel alloy (50/50) | 0–80 |
| Aluminum | 0–33 |
| Boron | 0–9 |

10. In an igniter assembly comprising, in combination, an igniter plug, a frangible container attached to said plug, a plurality of pellets of pyrotechnic material in said container, and means to ignite said pyrotechnic material, an ignition sustaining composition in said container and contiguous with said pyrotechnic material, said composition comprising sustaining material and a plurality of similar pellets of said pyrotechnic material partially embedded at random in said sustaining material, the latter material comprising 60 to 75 weight percent of an inorganic oxidizing salt selected from the group consisting of the ammonium, alkali metal, and alkaline earth metal salts of nitric, perchloric, and chloric acids, 10 to 40 weight percent of a binder comprising a rubber selected from the group consisting of polysulfide polymers, polyurethanes, and copolymers of conjugated dienes and vinyl substituted heterocyclic nitrogen bases, and 5 to 25 weight percent of finely divided metal selected from the group consisting of aluminum, magnesium, and titanium; said pellets of pyrotechnic material comprising 2 to 15 weight percent ethylcellulose, and 98 to 85 weight percent of a pyrotechnic component having the following composition in parts by weight:

| | |
|---|---|
| Potassium perchlorate | 0–68 |
| Barium nitrate | 0–70 |
| Zirconium dichromate | 0–58 |
| Zirconium/nickel alloy | 0–80 |
| Aluminum | 0–33 |
| Magnesium | 0–47 |
| Titanium | 0–65 |
| Zirconium hydride | 0–2 |
| Boron | 0–9 |
| Black powder | 0–3 |
| Tetranitrocarbazole | 0–5 |

11. In an igniter assembly for a rocket motor loaded with solid propellant, said igniter assembly comprising, in combination, an igniter plug, a frangible container secured to said plug, a plurality of pellets of pyrotechnic material in said container, and electrical means passing through said plug and into said container and adapted to ignite said pellets, an ignition sustaining composition in said container and comprising, in combination, sustaining material having one face thereof contiguous with said pellets, and a plurality of similar pellets of pyrotechnic material partially embedded at random in said sustaining material and having portions protruding from said face thereof, said sustaining material comprising 60 to 75 weight percent of an inorganic oxidizing salt selected from the group consisting of the ammonium, alkali metal, and alkaline earth metal salts of nitric, perchloric, and chloric acids, 10 to 40 weight percent of a binder comprising a rubber selected from the group consisting of polysulfide polymers, polyurethanes, and copolymers of conjugated dienes and vinyl substituted heterocyclic nitrogen bases, and 5 to 25 weight percent of finely divided metal selected from the group consisting of aluminum, magnesium, and titanium; said pellets of pyrotechnic material comprising 2 to 15 weight percent ethylcellulose, and 98 to 85 weight percent of a pyrotechnic component having the following composition in parts by weight:

| | |
|---|---|
| Potassium perchlorate | 0–68 |
| Barium nitrate | 0–70 |
| Zirconium dichromate | 0–58 |
| Zirconium/nickel alloy | 0–80 |
| Aluminum | 0–33 |
| Magnesium | 0–47 |
| Titanium | 0–65 |
| Zirconium hydride | 0–2 |
| Boron | 0–9 |
| Black powder | 0–3 |
| Tetranitrocarbazole | 0–5 |

12. An igniter assembly according to claim 11 wherein said inorganic oxidizing salt is potassium perchlorate, said rubber is a polysulfide polymer, and said finely divided metal is aluminum.

13. An igniter assembly according to claim 11 wherein said inorganic oxidizing salt is ammonium perchlorate, said rubber is a polysulfide polymer, and said finely divided metal is aluminum.

14. An igniter assembly according to claim 11 wherein said inorganic oxidizing salt is a mixture of potassium perchlorate and ammonium perchlorate, said rubber is a polysulfide polymer, and said finely divided metal is aluminum.

References Cited in the file of this patent

UNITED STATES PATENTS

| | | |
|---|---|---|
| 1,925,641 | Lucas | Sept. 5, 1933 |
| 1,974,015 | Decker et al. | Sept. 18, 1934 |
| 2,440,271 | Hickman | Apr. 27, 1948 |
| 2,462,135 | Skinner | Feb. 22, 1949 |
| 2,541,389 | Taylor | Feb. 13, 1951 |
| 2,561,670 | Miller et al. | July 24, 1951 |
| 2,685,837 | Sage et al. | Aug. 10, 1954 |
| 2,717,204 | Noddin et al. | Sept. 6, 1955 |

OTHER REFERENCES

Military Explosives, TM9–1910, to 11A–1–34, April 1955, page 276.